United States Patent [19]
Daspit

[11] 3,753,091

[45] Aug. 14, 1973

[54] METHOD AND DEVICE FOR DETECTING FAULTS IN NON-CONDUCTIVE COATINGS ON UNDER WATER PIPELINES

[75] Inventor: Walter J. Daspit, New Orleans, La.

[73] Assignee: Submarine Pipeline Technology Inc., New Orleans, La.

[22] Filed: Apr. 10, 1972

[21] Appl. No.: 242,870

Related U.S. Application Data

[63] Continuation of Ser. No. 847,185, Aug. 4, 1969, abandoned.

[52] U.S. Cl. .................. 324/54, 61/72.3, 324/52
[51] Int. Cl. ............................................. G01r 31/00
[58] Field of Search ............... 324/3, 37, 40, 54, 324/52, 67; 61/72.3, 72.4, 72.5

[56]  References Cited
UNITED STATES PATENTS

| | | | |
|---|---|---|---|
| 1,170,017 | 2/1916 | Stoller | 324/52 |
| 2,476,317 | 7/1949 | Nelson et al. | 324/52 |
| 2,629,002 | 2/1953 | Tinker | 324/54 |
| 2,698,921 | 1/1955 | Wharton | 324/52 |
| 2,942,181 | 6/1960 | Edwards et al. | 324/54 |
| 3,343,081 | 9/1967 | Lane | 324/54 |
| 3,418,572 | 12/1968 | Humphreys | 324/67 |
| 3,066,256 | 11/1962 | Rasor | 324/54 |
| 3,338,059 | 8/1967 | Tittle | 324/3 X |
| 3,394,303 | 7/1968 | Cressman et al. | 324/37 X |
| 3,526,831 | 9/1970 | Smith | 324/54 |

Primary Examiner—Gerard R. Strecker
Attorney—C. Emmett Pugh

[57]  ABSTRACT

The method of and apparatus for detecting faults in non-conductive coatings on underwater pipelines as the pipes are being laid by lay barges unto the ocean bottom or after the pipes have been laid on the bottom. The detector of the apparatus comprises in lay barge and jet barge embodiments three electromagnetic pickup coils placed near the pipe surface which detect a change in an electromagnetic field produced by a fault in the non-conducting coating as a low voltage is applied across the pipe. A Wheatstone bridge hookup is provided to maximize the effects of the system. One of the three coils is used as the primary sensing coil while the other two are used to indicate when the electromagnetic field is being unbalanced by the presence of nearby metal objects rather than by a fault in the coating. A simplified hand-held model having one coil is likewise disclosed.

14 Claims, 8 Drawing Figures

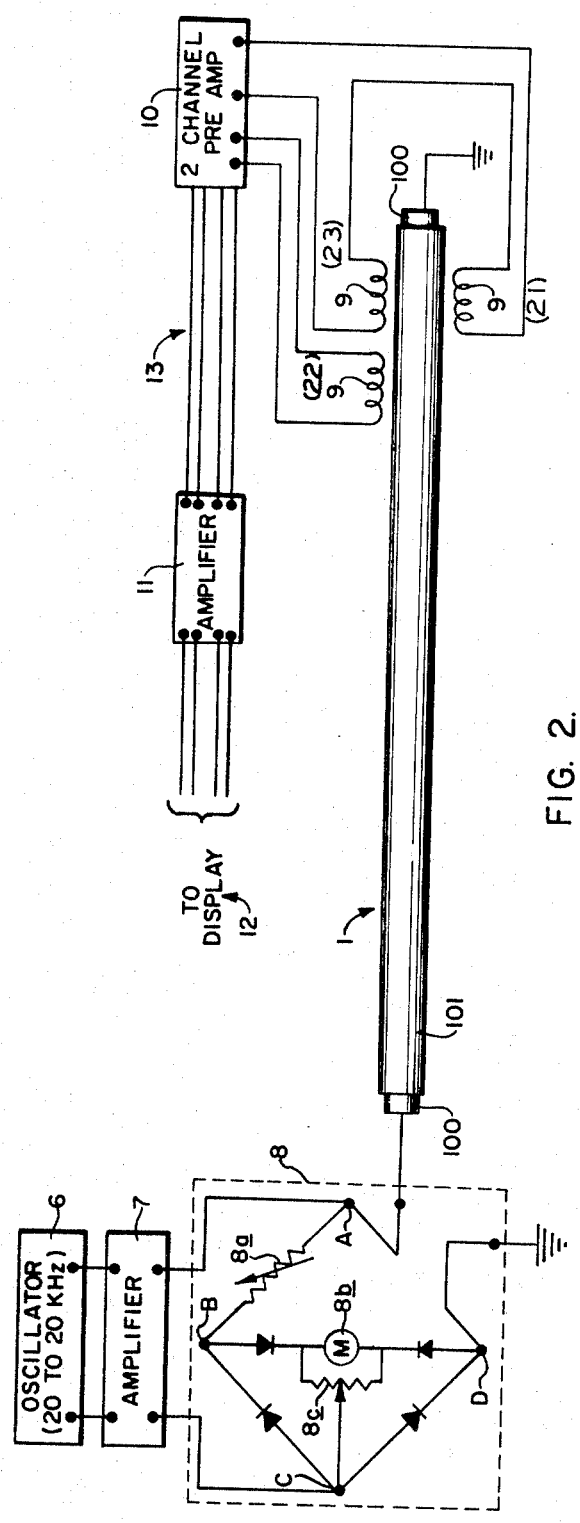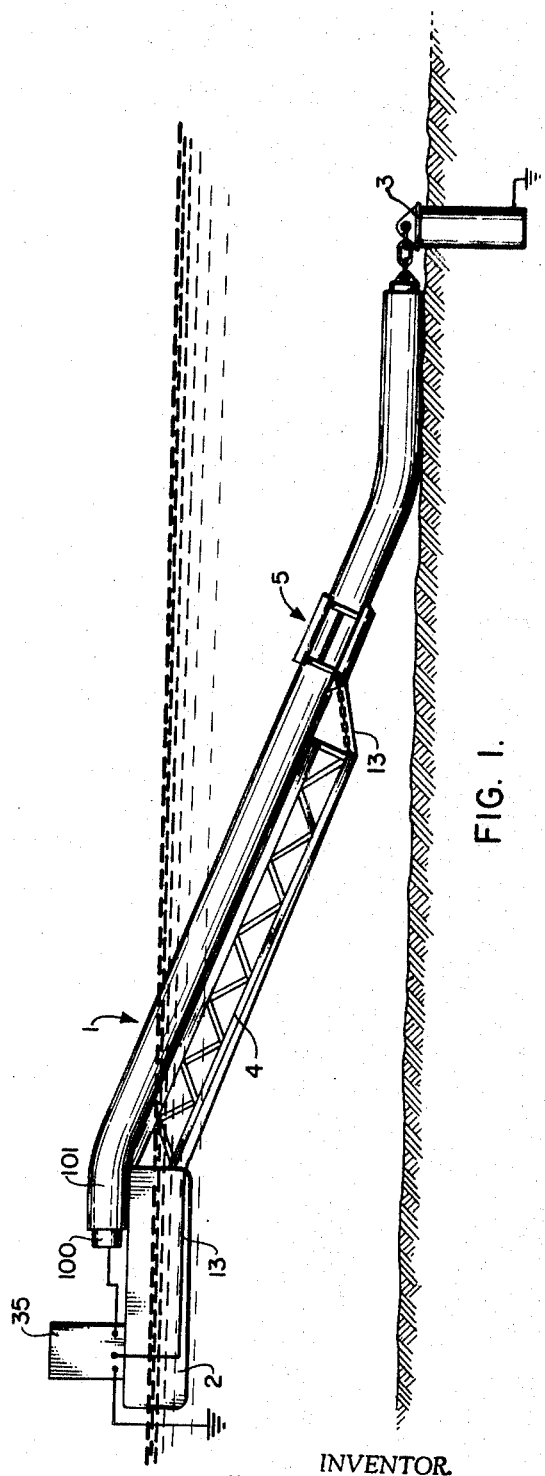
FIG. 2.
FIG. 1.
INVENTOR.
WALTER J. DASPIT, JR.
BY C. Emmett Pugh
ATTORNEY

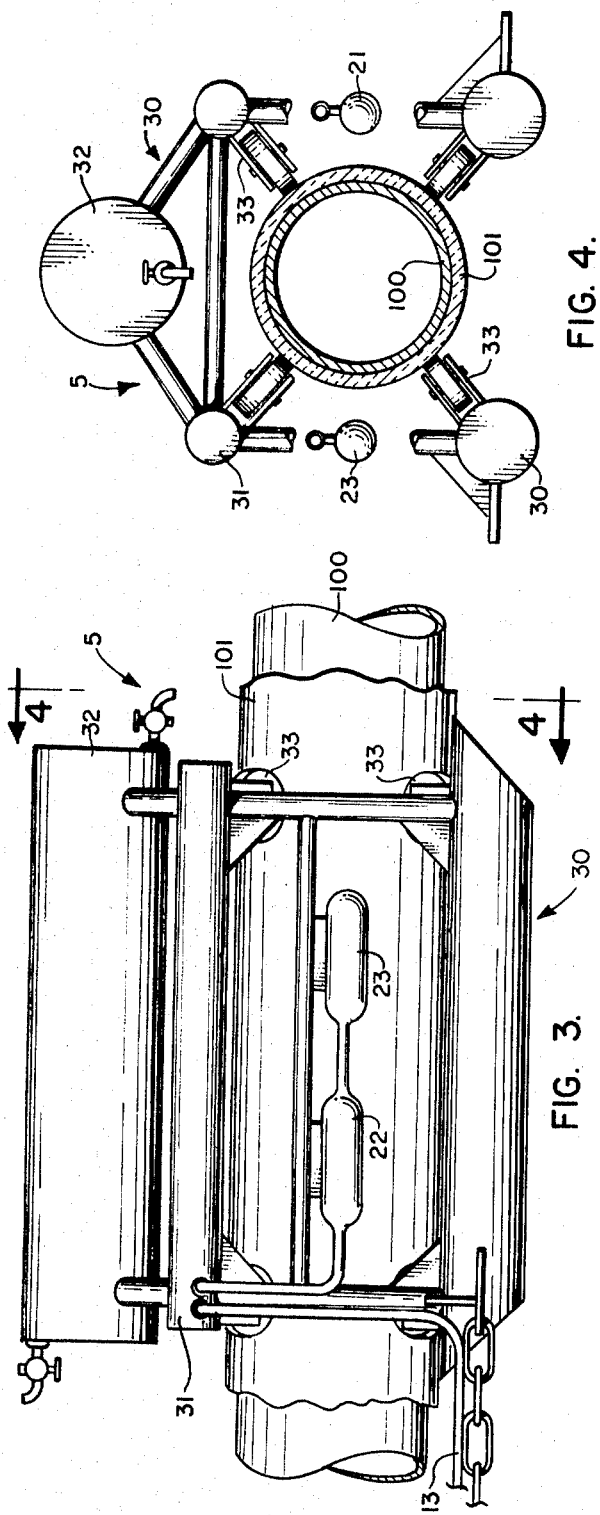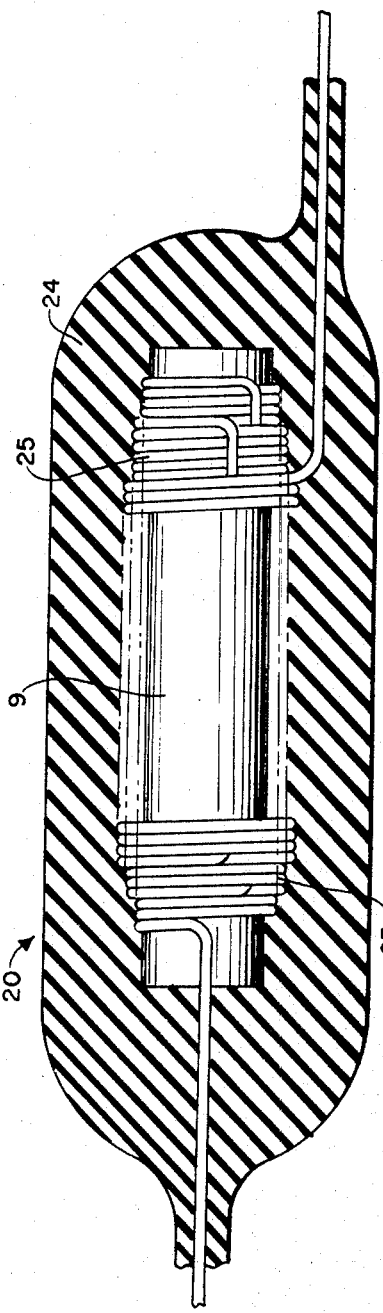
INVENTOR.
WALTER J. DASPIT, JR.
BY C. Emmett Pugh
ATTORNEY

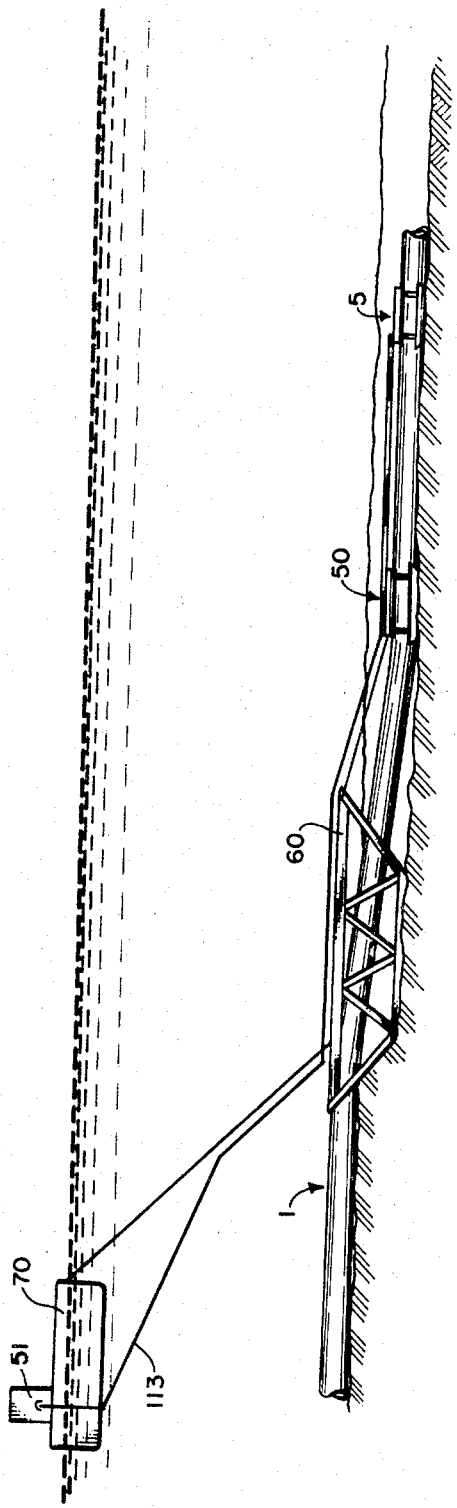
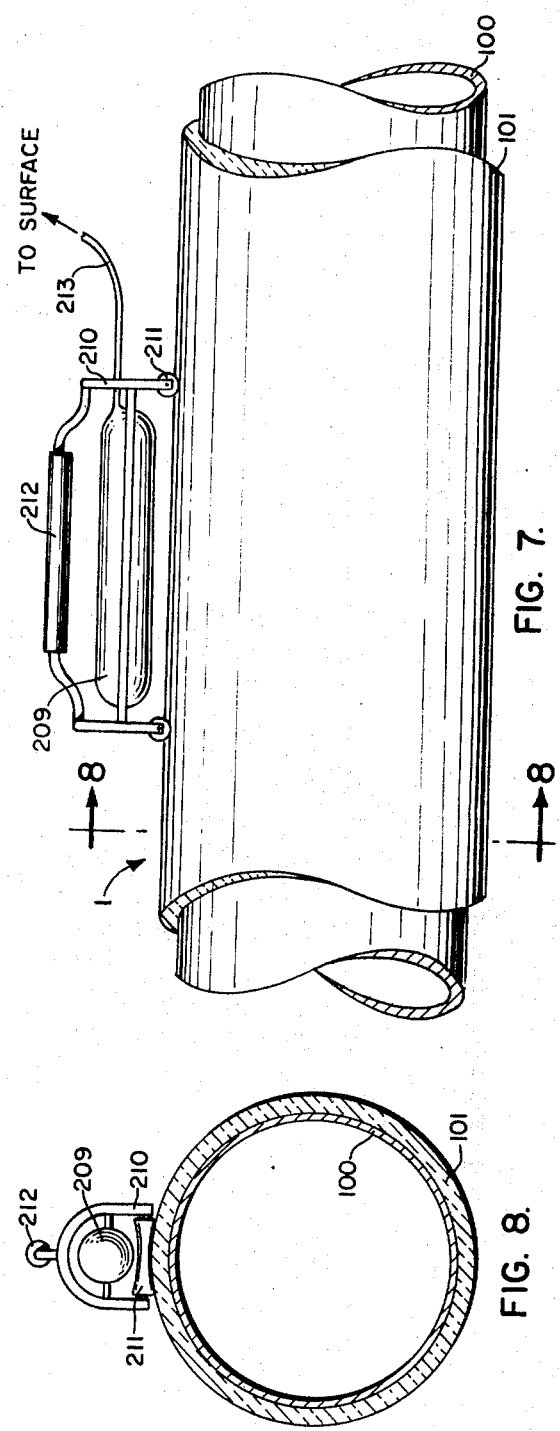
FIG. 6.
FIG. 7.
FIG. 8.
INVENTOR.
WALTER J. DASPIT, JR.
BY C. Emmett Pugh
ATTORNEY 3,753,091

METHOD AND DEVICE FOR DETECTING FAULTS IN NON-CONDUCTIVE COATINGS ON UNDER WATER PIPELINES

This application is a continuation of Ser. No. 847,185, filed Aug. 4, 1969, now abandoned.

BACKGROUND OF THE INVENTION

Submarine pipe lines are protected from cathodic corrosion by coating or wrapping a non-conductive layer on the exterior of the pipe. After the pipe is installed a current is applied to the pipe to minimize the development of cathodic areas on the surface of the pipe.

The usual method of installing submarine pipe lines is as follows. Pipe is stored and assembled or coiled on a lay barge. One end of the pipe is secured, for example, by a piling on the floor of the ocean, and the pipe is then pulled from the barge by moving the barge forward. In some laying operations the pipe is supported from the surface to near the bottom by a device called a "stinger." The protective non-conductive coating often has imperfections in it after application and is frequently damaged during installation, particularly by the stinger itself.

Pipe lines where the protective non-conductive coating is damaged suffer short lives because of the corrosive effects of the sea water and cause a great loss to the nation's natural resources. Moreover, premature rupture of a crude oil flow line can spill hundreds of barrels of oil into the water, causing irreparable damage to the beaches and flora and fauna of the area.

The present method of inspecting submarine pipe lines is simply by the use of deep sea divers who walk the pipe line behind the lay or jet barges and visually inspect the pipe. This method leaves much to be desired due in part to the fact that divers can only inspect the pipe after it is on the ocean floor, which physically limits this type of inspection to approximately 60 percent of the pipe's surface. Due to environmental conditions such as poor visibility, currents, short diving time, and the human element, the diver is not even able to give a truly complete and reliable inspection of the already limited 60 percent of the pipe. This method is expensive and yields little net result.

For years several devices, some using electromagnetic principles, have been proposed and used to inspect subterranean pipe lines and detect faults in non-conductive coatings but for many reasons these devices cannot be used in the submarine pipe line field, and are inapplicable here.

SUMMARY OF THE INVENTION

This invention relates to a method and apparatus for detecting faults in the non-conductive coatings which are placed on pipe for protection from cathodic corrosion. Examples of such coatings are cold tar somastics such as asphalt, polyvinyl tapes, epoxy coatings, and sprayed coatings of polypropelene or polyurethane.

The faults are detected by applying a low voltage to the coated pipe as it is being laid or after it has been laid and sensing the electromagnetic field surrounding the pipe. The presence of faults disturbs the electromagnetic field and this condition is sensed by one or more electromagnetic pick-up coilds placed in proximity to said pipe.

BRIEF DESCRIPTION OF THE DRAWINGS

FIG. 1 schematically illustrates the laying of pipe from a barge with the inspection of the present invention included;

FIG. 2 is a schematic representation, partly in block form, of the electrical elements and their relationships in the inspection system of the present invention;

FIGS. 3 and 4 are side and end, plan views, respectively, partially cut away, of the inspection module of the present invention, with FIG. 4 being taken across cross-sectional lines 4—4 of FIG. 3;

FIG. 5 is a close-up side view, partially cut away, of a pick-up coil used in the inspection module of the present invention;

FIG. 6 schematically illustrates the use of the present invention in the jetting or trenching operation which occurs after the pipe line has been laid;

FIG. 7 is a side, plan view, partially cut away, of a hand-held embodiment of the invention which is rolled along the pipe surface; and FIG. 8 is a front, cross-sectional view along line 8—8 of the embodiment of FIG. 7.

DESCRIPTION OF THE PREFERRED EMBODIMENTS

As is generally illustrated in FIG. 1, coated pipe 1 is laid on the sea floor by means of a lay barge 2. Pipe is stored and assembled or coiled on the lay barge 2 in the usual way. One end of the coated pipe 1 is secured to a piling 3 on the sea floor, and the coated pipe 1 is then pulled from the barge 2 by moving the barge 2 forward. As it is being laid, the coated pipe 1 is supported from the surface to near the bottom by a stinger 4.

In accordance with the present invention an inspection module 5 is placed behind the stinger 4 to detect any damaged or faulty areas in the non-conductive coating 101. When a stinger 4 is not employed, the inspection module 5 of the present invention is placed directly behind the barge 2 on the pipe line.

As is seen in FIGS. 3 and 4, the inspection module 5 includes at least three induction coil elements 20. One coil element 22 contains the primary sensing coil while the other two coil elements 21, 23 are connected in series. Coils 22, 23 are placed on the opposite side of the pipe line from the coil element 21. The two coil elements 21 and 23 will balance themselves under normal conditions, but, if the electromagnetic field is intensified or reflected by the presence of nearby objects, the balance of these two coils becomes disturbed, creating current in this circuit. The supplemental coil elements 21, 23 thus serve as a back-up system to the primary coil element 22 to indicate when a change in the electromagnetic field being sensed by primary coil element 22 is being caused by the presence of a fault in the coating 101 or by the presence of nearby objects affecting the electromagnetic field.

The pickup coils 9 of the coil elements 20 (21-23) are constructed of a high permeability type core, such as iron or ferrite with, for example, 2000 turns of Formvar coated No. 26 or No. 24 AWG magnet wire 25. The coils 9 are encapsulated in a waterproof dielectric medium 24 such as epoxy, for example, R.T.V. Silicone rubber, or neoprene. The encapsulation material forms a dielectric medium, which, because of the action of the surrounding water under the electromagnetic field, serves the very important function of enhancing the action of the electromagnetic field in the enducement of current in the coils 9. The thickness of the dielectric medium can be very important and, in the particular embodiment shown, a thickness of three inches has been found satisfactory.

The method of applying the turns of wire 25 are generally illustrated in FIG. 5. As is illustrated, the wire 25 is wound about the core in the same direction throughout with several layers of the wire 25 being formed over the core. As each layer is completed, the wire 25 is doubled back on itself in a direction parallel to the core and, upon reaching the starting end, a new layer is produced. It is desirable for maximum effectiveness that both the input and output leads are likewise placed parallel to the axis of the core, as is shown.

The electrical elements of this invention are diagramatically and schematically illustrated in FIGS. 1 and 2.

The transmitting unit 38, comprising an oscillator 6, an amplifier 7 and a retifying-type impedance or Wheatstone bridge 8, is located on the deck of the barge 2. The transmitter unit 38 is attached to the end of the electrically conductive pipe 100 as shown in FIG. 2.

The receiver unit, comprising a set of at least three induction coils 9, and a pre-amplifier 10, is mounted on a yoke or sled structure 30 as illustrated in FIGS. 3 and 4. The pre-amplifier is normally necessary only when the unbilical cable 13 exceeds 400 feet in length and can be contained in housing 31. The amplifier 11 and display 12 are located on the deck of the barge 2.

As shown in FIGS. 3 and 4, the yoke structure 30 includes a balast tank 32 and two straddling, flanking sides for supporting the pickup coil elements 20 (21–23) along the sides of the pipe 1 and in juxtaposition thereto. Sets of four roller bearing members 33 are included on the yoke to mate with the pipe 1 and to maintain the coils 9 in fixed, spaced relation to the pipe 1. The members 33 are designed to easily break away in case of the presence of any obstruction in order to protect the pipe 1. When it is desired to remove the inspection module 5, the bottom roller bearing members 33 are moved aside and the balast tank filled with air, to cause it to rise to the surface.

The invention operates as follows. The output of the oscillator 6 (20 to 20 KHz, 10 Volt rms), is amplified by amplifier 7 (100 watts). The output of the amplifier is applied across a half wave retifying type impedance or Wheatstone bridge 8. One leg (AB) of the bridge 8 contains a variable resistor 8a. On the other side of the bridge 8, one point (A) of the leg is attached to the pipe 100 and the other end of the (D) leg is grounded. It will be noticed that, with the rectifiers placed as shown (FIG. 2), current will flow through the pipe 100 and bridge 8 when point A is positive. This condition has proven best for the protection of the pipe 1 during inspection.

The bridge 8 allows the operator to balance the impedance of the output to that of the pipe 100 much more rapidly than other types of bridges, due to the fact that there is only one variable, namely, resistor 8a. It will be noticed that no current will pass through meter 8b when the side of the bridge ABC is balanced with side CDA. By placing a known resistor across points AD and adjusting the meter to the same value of the known resistor, the meter 8b can be brought to zero by adjusting the potentiometer 8c.

Once the bridge 8 is zeroed or nulled, the known resistor can be removed from points AD and this leg (AD) of the bridge 8 can be connected to the pipe 100 and grounded as previously described.

At this time the bridge 8 is brought into balance with the pipe 100 by varying resistor 8a. Under this condition the electromagnetic field surrounding the pipe 1 will be at its maximum, and this electromagnetic field will induce a steady current in the pickup coils 9.

The input of the pre-amplifier 10 is balanced to that of the coil 9. The output of the pre-amplifier 10 is brought to the surface by a shielded, waterproof, multiconductor unbilical cable 13, where it is amplified by amplifier 11 for the display console 12. The display console 12 can display the receiver's signal in forms such as an ampmeter, voltmeter, chart recorder, balanced bridge light or audio tone, as desired.

The receiving or inspection module 5 can be used either as a yoke or a sled, as described above, around the pipe 1. It can be attached to the barge 2 at the stinger 4 or to a towing bar attached to the barge 2. Depending on water depth, the laying procedure or bottom conditions will determine the position of the invention module 5.

The inspection module 5 is installed over the pipe 1 at the beginning of the pipe laying process. As each joint of pipe 1 is pulled from the barge 2 the transmitter at point A is attached to the end of the pipe 100 on the deck of the barge and the pipe 1 is inspected between the transmitter 30 and the inspection module 5.

Pipe 1 that has no defect or flaw in its nonconductive coating 101 will produce a steady electromagnetic field as it is pulled through the inspection module. Where the non-conductive coating 101 of the pipe has been damaged or contains a fault, some of the current in the pipe 100 will be lost to ground, thereby reducing the electromagnetic field strength after the flaw. As these flaws pass through the inspection module 5, there will be a noticeable increase in the receiver's signal and the increase noted at the display 12.

When a flaw is detected by the inspection module 5, its position on the pipe 1 can be marked by appropriate automatic equipment on the inspection module, or, as indicated more fully below, by a diver tending the inspection module. Alternately the position of the inspection module 5, the time of flaw detection, and the rate and amount of pipe laying can be carefully recorded, and the position of the flaw along the pipe 1 then determined and recorded.

During trenching or burying operations the pipeline 1 can be inspected by the addition of a transmitting module 50, as shown in FIG. 6, and the embodiment of FIG. 6 forms a second embodiment of the invention. The transmitting module 50 differs from the receiver or inspection module 5 only in the construction of the coil previously described electromagnetic coil 9. The transmitting module 50 is towed behind the trenching machine 60 which is in turn towed by barge 70.

The coil of the transmitting module 50 can be constructed of a dielectric core, with, for example, 2,000 to 3,000 turns of Formvar coated 22 AWG magnet wire. The transmitter unit 51 is located on the deck of a boat or barge and the signal is carried to the transmitting coil by means of a shielded unbilical cable 113. The coil of the transmitting module 50 will induce a current in the pipe 100. This will be detected by the receiving or inspection module 5 as previously described in the pipe laying embodiment of FIG. 1. The receiver or inspection module 5 should be towed at a distance of no less than 45 feet from the transmitting module 50 to eliminate interference. It is not necessary to use the rectifying type bridge 8 in this application, and thus the output of the transmitting amplifier 7 can be connected directly to the transmitting coil.

The described methods of inspection of FIGS. 1 and 6 may also be used in similar fashion in conjunction with a submarine for work in greater depths where towing by barge is not practical. For inspection behind a lay barge during pipe laying operations, the receiver is attached to the exterior of the submarine, and the submarine "walks" the pipe line behind the stinger. During jetting or trenching operations or in the inspection of an existing pipe line, the transmitter with coil is attached to the submarine exterior and the receiving module sled towed behind the submarine over the pipe line, achieving the same inspection and detection results as previously described in connection with FIG. 6.

In addition to the above-described embodiments of FIGS. 1 and 6, a hand-held embodiment of the present invention is illustrated in FIGS. 7 and 8. The hand-held model consists of a single receiving coil 209 with an umbilical cable 213 married to the diver's air hose and tied into the display module on deck, can be used by a diver to pinpoint the fault in the nonconductive 101 coating of the pipe line 1. So that the diver can locate the fault without direction from the surface, the output of the hand held receiving coil 209 can be amplified by an amplifier located on the deck of the barge or boat and connected directly to the divers communication system. This would give the diver a signal over his radio transceiver whenever the coil 209 passes in close proximity to the fault.

The hand-held model mounts the receiving coil 209 in an appropriate support structure 210 which rides over the pipe 1 by means of rollers 211. An appropriate handle 212 is included for use by the diver.

Since the lay barge 2 or jet barge 70 of FIGS. 1 and 6, respectively, cannot come to an immediate stop when a fault passes through the inspection module 5, it may be desirable for a diver to go down to the inspection module with the hand held model and work away from the lay or jet barge until he locates the exact point of damage or fault. The diver can then buoy or attach an ultrasonic pinger at the fault to be repaired at a later time.

Moreover, in some limited operations, such as in the cases of smaller lines (6 inches or under) where a stinger is not used or in shallow water, it may be desirable to have the diver walk the entire line with the hand held model rather than use the more involved systems of FIGS. 1 and 6, previously described.

A coated pipeline could likewise be inspected after it is buried by the apparatus of the present invention. However, to keep the apparatus "on line" appropriate guidance means would be necessary. Indeed variations of the apparatus could be made in order to use the apparatus to plot and map buried pipeline.

From the foregoing, it is apparent that the present invention has the following advantages and results:

1. The present invention uses a low voltage and is not destructive to the coating unlike those methods of non-submarine use which use high voltages to break down weak spots in the coating.

2. The equipment of the present invention can be used during any pipe laying operation offshore whether or not a stinger is used and can be used at any depth with 100 percent accuracy.

3. The present invention is of a great economic value to off-shore operators in that faults do not go undetected as previously and can be economically repaired as they occur. This cuts electrolysis down to a minimum and greatly increases the longevity of the pipe line. By increasing the longevity of pipe lines, the threat of a premature rupture is accordingly decreased and its inherent threat to the natural resources, flora and fauna of the area.

4. The present invention greatly reduces the cost of a pipe line inspection by giving a 100 percent inspection of the non-conductive coating as compared to a 15–20 percent inspection as results from the visual inspections normally conducted by divers. A diver is only able to feel and sometimes see approximately 60 percent of the pipeline. Any faults that are beneath the sheet iron or cardboard molds at the field joint likewise go undetected. Of course, any fault that is beneath the pipe line resting on the ocean floor additionally goes undetected. With the present invention, no faults go undetected and there is no human error possible.

5. Moreover the equipment of the present invention in itself cannot cause faults in the pipe line, since it is held in place by tension rollers and will become unattached to the pipe line when undue strain is put upon the inspection module.

6. The hand held model of the present invention can be used to walk all existing pipe lines that are in part exposed so that the receiving coil may be passed in close proximity to the exposed part of the pipe or on pipe lines as they are layed.

7. The present invention provides a great safety factor to vessels, their crews, divers and any installations in the area by increasing the longevity of pipe lines. Electrolysis will set up and attack any exposed metal portion of the pipe line, thereby weakening that area so that an unexpected rupture may occur while being subjected to the high pressures that occur in these pipe lines. Any resultant fires or explosions may cost lives and great damage. The best possible protection against this possibility is a properly inspected pipe line non-conductive coating.

What is claimed as invention is:

1. An off-shore apparatus for detecting faults in non-conductive coatings on underwater metal pipelines comprising:

signal producing means electrically connected to the pipeline for producing a signal in the pipeline;

signal detection means placed underwater in juxtaposition to the underwater pipeline for detecting signal changes which are a function of any substantial variation in the non-conductive characteristics of the coating on the coated pipeline, such as a fault in the coating;

support frame means, being at least in part underwater and straddling the underwater pipeline, for supporting and mounting said signal detection means in fixed relationship to the pipeline; and movement means for moving the pipeline and said support frame means relative to each other so that the pipeline moves through said support frame means, said signal detection means being held by said support frame means only a relatively short but uniform distance from the pipeline; whereby faults in the non-conductive coating on the pipeline can be detected underwater.

2. The apparatus of claim 1 wherein said signal producing and said signal detection means are electrical in nature, said signal producing means being electrical means for putting a voltage on the metal pipeline, producing an electromagnetic field surrounding the pipeline, and said signal detection means being electromagnetic sensing means for measuring the electromagnetic field produced by said signal producing means.

3. The apparatus of claim 2 wherein said electromagnetic sensing means comprises a set of at least three electromagnetic pickup coils, two of which are placed in a symetrically opposing position about the pipeline with respect to the third coil, one of said two coils being electrically connected in series with said third coil whereby the voltage induced in said coils by said electromagnetic field normally cancel each other out, the other coil being used as the primary sensor of the electromagnetic field and the two coils connected in series being used as a back-up, checking system.

4. The apparatus of claim 3 wherein said electrical means includes an impedance bridge network with the pipeline at one leg thereof; whereby the impedance of the pipeline can be balanced in the system.

5. The apparatus of claim 3 wherein said electromagnetic sensing means includes at least one electromagnetic pickup coil completely surrounded and encapsulated in a dielectric medium having a substantial thickness; whereby the electromagnetic field effect of inducing current in the coil is greatly enhanced.

6. The apparatus of claim 3 wherein said signal producing means is a low voltage.

7. The apparatus of claim 1 wherein the pipeline is being laid off a lay barge through a stinger, said support frame means being attached to the downstream end of the stringer, whereby any faults caused in the pipeline coating by the stinger can be detected.

8. The apparatus of claim 7 wherein said support frame means includes a yoke structure having two straddling, flanking sides upon which said signal detection means are mounted.

9. The apparatus of claim 8 wherein said yoke structure is four-cornered, the four corners being symmetrically disposed about the pipeline, said yoke including at each corner a set of roller bearing members which contact and mate with the pipeline as it moves past said support frame means, the roller bearing members serving to maintain said signal detection means in fixed, spaced relationship to the pipeline.

10. The apparatus of claim 9 wherein said support frame means includes an upper ballast tank, the lower two roller bearing members being movable laterally away from the pipeline, said support frame means being removable from the underwater pipeline to the surface by moving the lower two roller bearing members away from the pipeline and filling the ballast tank with air causing the support frame means to be freed from the pipeline and floated to the surface.

11. The apparatus of claim 1 wherein the pipeline is already on the water bottom and is being worked on at the bottom by a jet sled, said support frame means being attached to the back of the jet sled, whereby any faults caused in the pipeline coating by the jet sled can be detected.

12. The apparatus of claim 1 wherein there is further included in the apparatus fault recording means for recording the location on the pipeline of any detected fault.

13. The apparatus of claim 12 wherein said fault recording means is located on said support frame means.

14. The apparatus of claim 12 wherein said fault recording means includes means for recording the time of fault detection and means for measuring the rate and amount of a pipeline movement through said support frame means.

* * * * *